Aug. 1, 1950  J. F. SKELLY  2,517,042
METHOD FOR TRANSFERRING FLUIDIZED SOLID PARTICLES
Filed Dec. 14, 1946
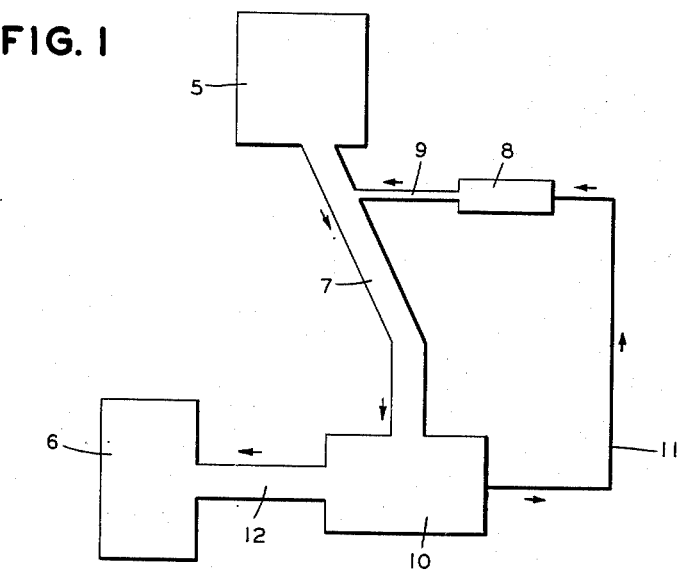
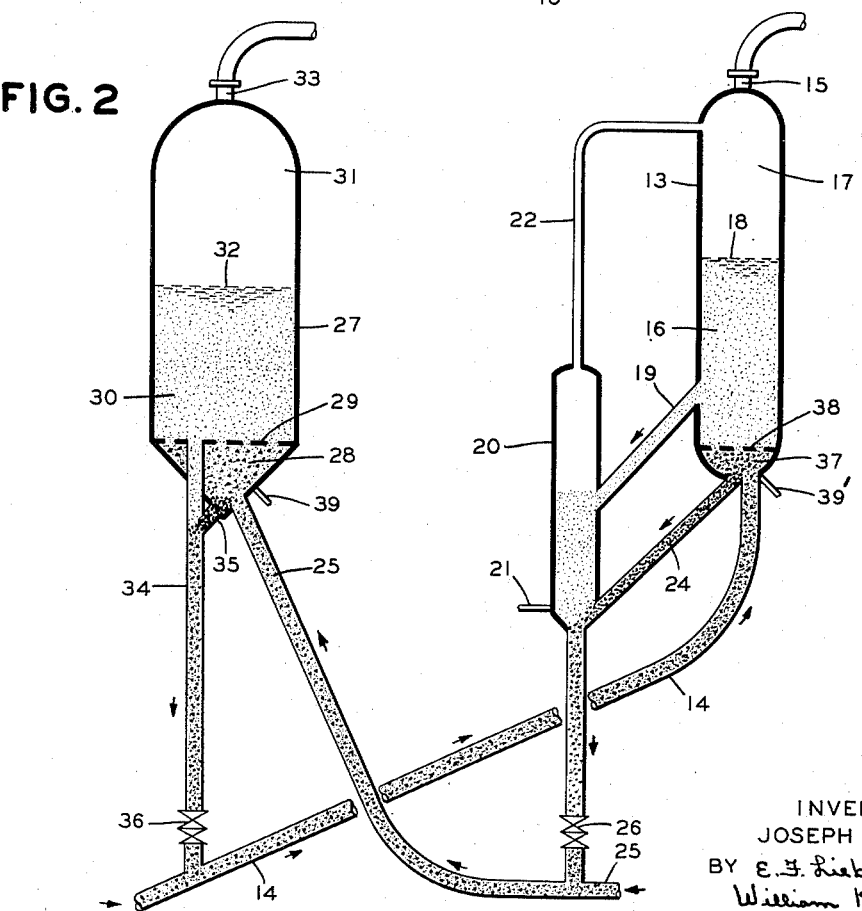
INVENTOR
JOSEPH F. SKELLY
BY E. J. Liebrecht
William Klabunde
ATTORNEYS Patented Aug. 1, 1950

2,517,042

UNITED STATES PATENT OFFICE 2,517,042

METHOD FOR TRANSFERRING FLUIDIZED SOLID PARTICLES

Joseph F. Skelly, New York, N. Y., assignor to The M. W. Kellogg Company, Jersey City, N. J., a corporation of Delaware Application December 14, 1946, Serial No. 716,303

10 Claims. (Cl. 23—1)

This invention relates in general to a method for transporting fluidized solid material from a zone of low pressure to a zone of high pressure, and particularly to a method for transferring fluidized solid material between separate zones maintained at different pressures and having associated therewith a standpipe for developing a hydrostatic pressure effective to transfer the fluidized material from the zone of lower pressure to the zone of higher pressure. More particularly the invention relates to a method for reducing the height of standpipe required in connection with a vessel containing a fluidized mass of solid material to develop a desired hydrostatic pressure at a point below the elevation of the vessel.

The invention is particularly adaptable for use in connection with the transfer of fluidized solid contact materials, such as catalysts, or reactants in solid powder form in the chemical processing and oil refining industries.

In its broader aspects, the invention contemplates the passage of a stream of fluidized solid material under the force of gravity from one zone to a second zone at a lower elevation, the second zone being maintained at a higher pressure than the first zone and being separated therefrom by a vertical distance less than that normally required to build up sufficient hydrostatic pressure to effect the free flow of fluidized material into the second zone.

In such application, the fluidized solid material may be passed from a vessel to a point in a carrier line maintained at a higher pressure, or fluidized solids may be passed between separate contact zones.

In the transfer of fluidized solid material between separate contact zones, such as, for example, the reactor and regenerator vessels employed in the fluid catalytic cracking of petroleum oils, the usual practice is to withdraw fluidized spent catalyst from the dense bed of the reactor into a stripping zone wherein by counter-current contact with a gas stream hydrocarbon vapors are removed from the catalyst stream and returned overhead to the dispersed phase of the reactor. The fluidized stripped spent catalyst passes from the bottom of the stripper through a vertical standpipe to a carrier line wherein it is picked up by a stream of oxygen-containing gas and passed upwardly to the dense phase of the regenerator. The standpipe is necessarily of a sufficient length to develop a hydrostatic pressure sufficient to raise the catalyst to the elevation of the dense bed in the regenerator. After a suitable contact time within the regenerator to burn off the coke accumulated on the catalyst, the revivified catalyst is withdrawn from the dense phase bed of the regenerator through a vertical standpipe and passed to a carrier line, where it is picked up by a stream of hydrocarbon oil or vapors and returned to the dense phase bed of the regenerator. The regenerator standpipe also must be of a length sufficient to develop the hydrostatic pressure necessary to transfer the regenerated catalyst to the elevation of the dense phase bed of the reactor.

The standpipe height required in a given installation to pass the powdered material from the zone of low pressure to the zone of high pressure is dependent upon the specific gravity of the catalyst and the powder concentration existing in the standpipe. In the present practice, standpipe heights of 50 to 100 feet are ordinarily required. When handling a relatively light powdered material, such as a silica-alumina cracking catalyst, however, the standpipe powder concentration may be as low as 25 to 30 pounds per cubic foot, which would necessitate a standpipe height of about 80 to 100 feet to pass the catalyst from the regenerator to the reactor.

Since standpipe height determines the relative elevations of the reactor and the regenerator vessels and the various pieces of apparatus intimately associated therewith, it is apparent that the amount and size of the supporting apparatus and the length of piping required in the transfer lines increases with an increase in standpipe length, thus materially affecting construction and maintenance costs.

A principal object of my invention is to provide a method for decreasing the height of standpipe required to build up a hydrostatic pressure effective to pass a fluidized stream of finely divided solid material from the lower pressure zone to the higher pressure zone of two zones maintained at a pressure differential.

Another object is to provide a method for increasing the density of a fluidized stream of finely divided solid material in a portion of its path between two zones maintained at a pressure differential.

A further object is to provide a method for continuously passing finely divided solid material in a fluidized state back and forth between separate contact zones through a transfer line system including a standpipe whereby the required vertical length of the standpipe may be substantially decreased.

A further object is to provide a method for introducing into and subsequently removing from a transfer line for transporting fluidized solid contact material between separate contact zones a second fluidized inert material heavier than the first material and effective to raise the hydrostatic pressure of the contact material at a withdrawal point below the first contact zone sufficiently to transfer the contact material to the elevation of the second contact zone.

These and other objects are effected by my invention, as will be apparent from the following description and claims taken in connection with the accompanying drawing forming part of this application, in which:

Fig. 1 is a diagrammatic view showing the invention in its elemental form; and

Fig. 2 is a schematic view in elevation showing the application of my invention to a typical fluid catalytic cracking process.

Referring to the drawing, Fig. 1 illustrates the invention in its basic or elemental form employed for transferring fluidized powder from a low pressure zone to a high pressure zone through a standpipe in communication with the former. The numeral 5 refers to a low pressure zone containing a bed of finely divided solids in a state of extreme agitation under the influence of a rising gas stream, not illustrated, in which each of the individual solid particles is suspended, so that the powdered mass is in a pseudo-liquid condition or state of fluidization.

The powdered material in low pressure zone 5 is to be transported to a high pressure zone 6 by means of standpipe 7 connected to the zone 5 through which the powdered material descends by gravitational force. At a point high in the standpipe a stream of relatively heavy powder from a feed source 8 is injected through conduit 9. The admixture of relatively heavy powder from source 8 and light powder from zone 5 is passed downwardly through the standpipe 7 to a separating zone 10 in communication with the base of the standpipe.

The introduction of the heavy powder into the standpipe effects a substantial increase of powder density therein so that for a given length of standpipe a higher static pressure may be developed at the lower end than could be obtained by the light powder alone. The standpipe is so designed, and the feed of heavy powder into the standpipe so controlled, that the static pressure at the base of the standpipe will be greater than the pressure within the high pressure zone 6.

Within the separating zone 10 any of the conventional means for separating mixtures of light and heavy solid particles, or for separating mixtures of particles having distinct characteristics, as for example, where one of the substances is magnetizable, may be employed. After separation within the zone 10 the heavy powder is withdrawn through conveyor 11 and returned to the feeder 8 for subsequent recirculation through the standpipe.

The light powder is withdrawn from separating zone 10 and passed through line 12 to the high pressure zone 6, by reason of the pressure differential existing between zones 10 and 6.

Fig. 2 illustrates the invention in one of its practical applications, such as a typical fluid catalytic cracking system. The numeral 13 represents schematically a reactor vessel wherein a fluidized bed of catalytic material is maintained in phase separation in contact with an upwardly flowing stream of hydrocarbon vapors introduced into the reactor 13 through the carrier or reactor feed line 14 and discharged, after a sufficient contact time to effect the desired conversion, through the overhead outlet 15. Additional apparatus, for catalyst recovery and treatment of the hydrocarbon effluent, but forming no part of the present invention, has been omitted. The interface or bed level separating the dense phase 16 from the dispersed phase 17 of the fluidized catalyst mass is indicated by the numeral 18.

Spent catalyst is continuously withdrawn from the dense phase bed 16 of the reactor and passed through line 19 to a spent catalyst stripper 20 wherein the catalyst passes downwardly in counter-current contact with a suitable stripping medium injected through inlet 21, which carries the entrained hydrocarbon vapors overhead through line 22 to the dispersed phase 17 of the reactor.

Stripped catalyst is withdrawn from the bottom of the stripper 20 and passed downwardly through a vertical standpipe 23. At the upper end of standpipe 23 a fluidized stream of relatively heavy inert material is introduced into the stripped catalyst stream through line 24.

The heavy fluidized inert powder, which is to serve as a carrier material, descends through the stripper standpipe 23 in admixture with the lighter catalyst powder to the carrier line 25, to which it is admitted through the slide-valve 26. The mixture of contact material and inert carrier material is picked up and aerated by the incoming air stream in carrier line 25 and, by reason of the decreased density in the carrier line resulting from the aeration, and the high hydrostatic pressure at the base of the standpipe, is transported through the carrier line 25 to the regenerator vessel 27, which is maintained at a pressure lower than the pressure at the foot of the stripper standpipe 23.

In a typical application of my invention, catalytic material, which may be synthetic or natural, of an average particle size in the order of 40 microns may be maintained in the dense bed 16 of the reactor at a powder concentration of approximately 20 pounds per cubic foot. Inert carrier material comprising a relatively heavy fluidizable powder, such as iron filings, copper oxide, etc., of a particle size in the order of 50 microns, may be maintained in the supply line 24 at a powder concentration of about 60 pounds per cubic foot. When the catalytic contact material and the inert carrier material are admixed in the stripper standpipe 23, a powder concentration or density of 40 pounds per cubic foot may be attained. The hydrostatic pressure produced at the foot of the standpipe 23 by the admixture of contact and carrier powders may be approximately 14 pounds per square inch, which may be in the order of 30 to 80 per cent higher that that obtainable by the catalytic material alone. It is, therefore, obvious that this method of attaining a desired hydrostatic pressure permits a substantial reduction in standpipe height.

Upon entering regenerator vessel 27, the combined powder and air stream from carrier line 25 first passes into a separating zone 28 in the base of the vessel immediately below the grid 29 which supports the dense bed of fluidized catalyst within the regenerator. Within the separating zone 28, which also serves as a gas distributing zone, the light catalytic material is separated, preferably by elutriation, from the heavier inert carrier material. The catalyst is carried upwardly by the gaseous stream through the grid 29 into the main body of the regenerator, where it undergoes a phase separation. In the dense phase 30, the air stream which initially served as a carrier fluid by aerating the powder mixture so as to effect its passage upwardly through the carrier line 25, supplies oxygen to continuously regenerate the catalyst by burning off the deposited coke. The gaseous products of regeneration pass from the dense phase 30 to the dispersed phase 31 through the interface 32, defining the bed level, and are withdrawn overhead from the regenerator through the outlet 33.

Regenerated catalyst is continuously withdrawn from the dense phase 30 of the regenerator through the vertical standpipe 34. The heavier inert carrier material which, in separating from the catalyst, settles at the bottom of the separating or elutriating zone 28, is continuously withdrawn from the latter zone and is passed through line 35 to the standpipe 34 at a point near its upper end. The introduction of the heavier inert material into the stream of lighter catalytic material effects an appreciable increase in density within the standpipe, similar to the effect produced by its introduction into stripper standpipe 23. The mixture of catalyst and inerts passes downwardly through standpipe 34 to the carrier or reactor feed line 14, to which it is admitted in controlled amount through the slide valve 36.

At the point of entry into the carrier line 14 immediately below the slide valve 36 the point of maximum pressure is reached, and it is necessary for the heavy inert material to effect a pressure build-up within the standpipe sufficient to pass the standpipe stream into the carrier line. The pressure at the juncture of the standpipe 34 and the reactor feed line 14, therefore, is sufficiently higher than the pressure in the reactor to cause an upward flow through line 14.

In carrier line 14, the admixture of catalyst and inert material is picked up by a feed stream of fresh oil from a feed preheating furnace, not shown. Upon contact with the hot powdered material from the standpipe, the oil is flash-vaporized and the mixture of oil vapors, catalyst and inert material is forced up the carrier line 14 to the reactor 13.

Passing through the bottom of the reactor 13, the feed stream of hydrocarbon vapors, catalyst and carrier material first enters a separating zone 37, similar to the separating zone 28 of the regenerator. Here the lighter catalyst particles are separated, preferably by elutriation, from the heavier particles of carrier material, and are passed with the hydrocarbons through the grid 38 which supports the dense bed of fluidized catalyst within the reactor. The separated inert carrier material accumulates at the bottom of the separating or elutriating zone 37, from where it is withdrawn for recirculation through line 24. Zone 37 serves also as a distributing chamber for attaining the desired mixing of the hydrocarbon vapors and catalyst before proceeding to the main reaction zone in the dense phase bed.

In some cases it may be desirable or necessary to provide additional aeration of the powdered material within the separating zones 28 and 37. For this purpose, aerating fluid may be introduced as needed into the zones through inlets 39 and 39'.

It is readily apparent from the foregoing that I have provided a simple and effective method for reducing the height of standpipe required to develop a given hydrostatic pressure, and have thus made possible a material saving in size and amount of structure required to support a regenerator or reactor at an elevation suitable to permit a desired build-up in hydrostatic pressure.

Since the drawings are more or less schematic, various parts of the apparatus have been eliminated for the sake of simplicity. For example, control valves have not been shown in the heavy powder lines 24 and 35 and in the line 19 connecting the reactor 13 with the spent catalyst stripper 20.

It is to be understood that the difference in size between the light and heavy solid material, as illustrated in Fig. 2, is pronounced merely for the purpose of illustration and that it is not essential for a proper functioning of the invention that there be any difference in size, although in a proper case such difference is contemplated.

The separating means employed for separating the light powder from the heavy powder is not limited to an elutriator, but may consist of suitable means for screening the admixture when there is a marked difference in average particle size between the light and heavy powders. Or, in the event that one of the powdered materials is composed of a magnetizable substance, magnetic means may be employed to effect a separation.

In connection with Fig. 1, it is contemplated that any suitable pneumatic, hydrostatic, or mechanical means may be employed to convey the separated heavier powder from the zone 10 to the point of introduction into the standpipe.

It will be apparent to those skilled in the art that various other changes and modifications may be made without departing from the spirit of the invention, and it is desired, therefore, that only such limitations shall be placed thereon as are imposed by the appended claims.

I claim:

1. A method for transferring fluidized solid contact material between separate contact zones, wherein gas is passed upwardly through said contact material at a velocity sufficient to maintain said material in the form of lower dense phases separated by interfaces from superimposed diffuse phases, which comprises the steps of: downwardly withdrawing a stream of contact material from the dense phase of one of said zones to form a substantially vertical elongated column of contact material exerting hydrostatic pressure at the base thereof, introducing a material heavier than said contact material at a high point in said column, withdrawing the admixture of said contact material and said heavier material from the base of said column into a stream of carrier gas to form a suspension thereof in said gas, flowing said suspension to a separation point adjacent the other zone, effecting separation of said contact material and said heavier material, and passing said separated contact material into the dense phase of said other zone.

2. A method as in claim 1, including the step of returning said separated heavier material for reuse to said high point in said column.

3. A method as in claim 1, including the steps of downwardly withdrawing a stream of contact material from the dense phase of said other zone to form a second vertical elongated column of contact material exerting hydrostatic pressure at the base thereof, introducing said separated material heavier than said contact material at a high point in said second column, withdrawing the admixture of said contact material and said heavier material from the base of said second column into a second stream of carrier gas to form a suspension thereof in said gas, flowing said suspension to a separation point adjacent the first-mentioned zone, effecting separation of said contact material and said heavier material, and passing said separated contact material into the dense phase of said first-mentioned zone.

4. A method as in claim 3, including the step of reintroducing separated heavier material from said second-mentioned separation step to said high point in said first-mentioned column.

5. A method for transferring fluidized solid contact material between separate contact zones, wherein gas is passed upwardly through said contact material at a velocity sufficient to maintain said material in the form of lower dense phases separated by interfaces from superimposed diffuse phases, which comprises the steps of: downwardly withdrawing a stream of contact material from the dense phase of one of said zones to form a vertical elongated column of contact material exerting hydrostatic pressure at the base thereof, introducing a material heavier than said contact material at a high point in said column, withdrawing the admixture of said contact material and said heavier material from the base of said column into a stream of carrier gas to form a suspension thereof in said gas, flowing said suspension to a separation point adjacent the other zone, reducing the velocity of said gas at said separation point to effect by elutriation a separation of said contact material and said heavier material, and passing said separated contact material into the dense phase of said other zone.

6. A method as in claim 5, including the step of returning said separated heavier material for reuse to said high point in said column.

7. A method as in claim 5 including the steps of downwardly withdrawing a stream of contact material from the dense phase of said other zone to form a second vertical elongated column of contact material exerting hydrostatic pressure at the base thereof, introducing said separated material heavier than said contact material at a high point in said second column, withdrawing the admixture of said contact material and said heavier material from the base of said second column into a second stream of carrier gas to form a suspension thereof in said gas, flowing said suspension to a separation point adjacent the first-mentioned zone, reducing the velocity of said second gas stream at said separation point to effect by elutriation a separation of said contact material and said heavier material, and passing said separated contact material into the dense phase of said first-mentioned zone.

8. A method as in claim 7 in which said heavier material separated at each of said separation points is passed downwardly therefrom to said points of introduction into said columns.

9. A method as in claim 8, including the step of passing said separated heavier material for reuse to said high point in said column.

10. A method for effecting the transfer of fluidized solid material from a confined zone to a second confined zone maintained at a higher pressure comprising the steps of downwardly withdrawing a stream of said material from said first-mentioned zone to form a substantially vertical elongated column of said material exerting hydrostatic pressure at the base thereof, introducing a material heavier than said fluidized solid material at a high point in said column, withdrawing the admixture of said material and said heavier material from the base of said column and passing said admixture to a separation point, effecting separation of said material and said heavier material, and passing said separated material into said second confined zone.

JOSEPH F. SKELLY.

REFERENCES CITED

The following references are of record in the file of this patent:

UNITED STATES PATENTS

| Number | Name | Date |
| --- | --- | --- |
| 2,400,176 | Thiele | May 14, 1946 |